United States Patent [19]
Elonen et al.

[11] Patent Number: 5,711,789
[45] Date of Patent: Jan. 27, 1998

[54] APPARATUS FOR PUMPING GAS-CONTAINING FIBER SUSPENSIONS

[75] Inventors: Jorma Elonen, Jämsänkoski; Heikki Manninen, Ummeljoki, both of Finland

[73] Assignee: A. Ahlstrom Corporation, Noormarkuu, Finland

[21] Appl. No.: 135,858

[22] Filed: Oct. 13, 1993

Related U.S. Application Data

[63] Continuation of Ser. No. 763,637, Sep. 23, 1991, abandoned.

[30] Foreign Application Priority Data

Sep. 25, 1990 [FI] Finland .................... 904701

[51] Int. Cl.$^6$ .................................. B01D 19/00
[52] U.S. Cl. .................................. 96/216; 95/261
[58] Field of Search .......................... 96/216, 217, 214, 96/207, 208; 95/261; 55/342, 345

[56] References Cited

U.S. PATENT DOCUMENTS

| | | | |
|---|---|---|---|
| 2,642,950 | 6/1953 | Clark | 162/380 |
| 3,230,890 | 1/1966 | Yokata | 415/169.1 |
| 4,253,857 | 3/1981 | Fisher | 55/430 |
| 4,276,758 | 7/1981 | Gullichsen | 415/169.1 |
| 4,555,254 | 11/1985 | Fisher | 55/345 |
| 4,675,033 | 6/1987 | Fellmen et al. | |
| 4,834,547 | 5/1989 | Niskanen | 55/203 |
| 5,019,136 | 5/1991 | Elonen et al. | 55/203 |

FOREIGN PATENT DOCUMENTS 0440455   8/1991   European Pat. Off. ............. 55/36

*Primary Examiner*—Brenda A. Lamb
*Attorney, Agent, or Firm*—Cohen, Pontani, Lieberman & Pavane

[57] ABSTRACT

The present invention relates to a method and an apparatus for separating gas from solids-containing liquid. The apparatus in accordance with the invention may be applied in such places where air is separated from a medium by means of reduced pressure or vacuum condition. The apparatus in accordance with the present invention is especially applicable for the pulp and paper industry in situations where gas has been separated from the fiber suspension, but where the gas contains some fibers or other solids, which must be separated from the gas flow prior to the vacuum pump generating suction. The method in accordance with the present invention is characterized in that the fraction containing gas, liquid and solid material is passed from the pulp treatment apparatus to a separate separating apparatus, solids are separated from that fraction, which are then discharged from the separation apparatus. A gas or gas-liquid solution is guided to the vacuum apparatus and the gas or gas-liquid solution is discharged from the system. The apparatus in accordance with the present invention consists of a separating apparatus with a separation chamber having an impeller and a vacuum apparatus, which are separate from a centrifugal pump for pumping the medium.

7 Claims, 4 Drawing Sheets

APPARATUS FOR PUMPING GAS-CONTAINING FIBER SUSPENSIONS

This is a continuation of U.S. application Ser. No. 07/763,637, filed Sep. 23, 1991 now abandoned.

FIELD OF THE INVENTION

The present invention relates to an apparatus for pumping gas-containing fiber suspensions of pulp and paper industry. The apparatus in accordance with the invention may be applied in such places where the fiber suspension to be pumped contains excess amount of gas, making it difficult to pump the suspension by a centrifugal pump. The gas, most often air, is separated from the fiber suspension by means of a reduced pressure or vacuum condition. The apparatus in accordance with the present invention is especially suitable for application in the pulp and paper industry in situations where gas has initially been separated from the fiber suspension in a centrifugal pump, but where that gas still contains some fibers or other solids, which must be separated from the gas flow prior to entry into the vacuum pump which generates the suction.

Although the invention is discussed below in connection with the apparatuses and processes of wood, pulp and paper processing industries, the method and apparatus may also be applied in other instances, for other corresponding purposes.

BACKGROUND OF THE INVENTION

Gas-containing liquids such as fiber suspensions are difficult to pump by means of a centrifugal pump as the gas has a tendency to separate in the suction duct of the pump and form a gas bubble in front of the impeller due to the rotational movement in the suction duct imparted by the rotating impeller. When such a gas bubble grows large enough, the impeller rotates in the bubble, not being able to create the suction needed for making the pulp flow into the pump, whereby the pumping is, at least momentarily, stopped. Usually, when the consistency of the pulp is not very high, the pulp flows due to gravity in the pump, pushing the gas bubble forward. However, this kind of operation creates pressure pulses in the outlet piping of the centrifugal pump, which may result to mechanical damages in the piping.

The prior art discloses systems for solving the above problem. For example, in the wood processing industry, these systems separate gas from fiber suspensions during pumping, and the gas flows eventually to a vacuum pump, through a main chamber of a centrifugal pump having a first impeller, then through a separation chamber having a second impeller located behind the first impeller. This kind of system is illustrated, for example, in U.S. Pat. No. 3,230,890, in which FIG. 1 discloses a system in which a centrifugal pump has a first impeller that is arranged in a main chamber and mounted on the driving end of the shaft of the pump. The same shaft is also provided with a second impeller located in a separation chamber immediately behind the first impeller of the centrifugal pump, the second impeller situated so that it pumps liquid which has entered into the space of the separation chamber tangentially outward in a similar manner to the centrifugal pump. A vacuum pump is arranged at and driven by the driven end of the same shaft as the centrifugal pump. The vacuum pump is connected to the separation chamber having the second impeller by means of a pipe or conduit which is outside the pump space, with a duct or opening which is in communication with the rear outer wall of the separation chamber, leading to a position in close proximity to the shaft. Thus, the system operates by centrifugally separating solids which enter the separation chamber from the main chamber, and the gas is then withdrawn by the vacuum pump.

The first impeller of the centrifugal pump is provided with openings, through which gas flows to the separation chamber behind the first impeller, due to a relatively reduced pressure or vacuum condition that exists in the separation chamber due to the suction of a vacuum pump in communication with the separation chamber. In the separation chamber, the gas and the liquid and solids possibly entrained therewith are subjected to a centrifugal force from the rotational movement of the second impeller, which causes the denser liquid and solid components to move toward the periphery, while the less dense gas remains, to a greater extent, in region near the shaft. The purpose of this structure is to separate solids from the gas so that the vacuum pump, which acts to withdraw the gas components from the region near the shaft, draws primarily gas or possibly some liquid, but no solids. In U.S. Pat. No. 3,230,890, separated solids and the liquid withdrawn in conjunction with them are suggested to be recycled and injected into the flow stream of the liquid and solids with entrained gas near the inlet port of the main chamber of the centrifugal pump.

U.S. Pat. No. 4,675,033 generally speaking relates to a fluidizing centrifugal pump for pumping medium consistency pulps i.e. fiber suspension having a consistency of about 8 to 20%. This reference discloses several slightly different technical solutions for separating gas from fiber suspensions. According to one embodiment disclosed therein, openings between the vanes of an impeller and a shaft of a pump are provided, through which openings gas, which has accumulated as a bubble in front of the impeller, is allowed to flow to the space behind the impeller. The rear wall of the pump is provided with an annular channel, through which the gas is allowed to flow further to a separation chamber, in which a bladed rotor separates from the gas entrained solid particles, and gas may be passed out of the system through a separately run vacuum pump system.

As demonstrated in the prior art, various methods have been developed on the one hand for separating gas from liquids and on the other hand for separating solids from a gas fraction. Another system also in use consists of an integrally built vacuum pump which has a separation chamber preceding it, unlike in prior designs where the chamber has been located behind the impeller of a centrifugal pump. However, these designs are similar in that the second impeller and the separation chamber have always been located as close to the impeller as is technically possible.

The prior art taught that various reasons for the preferred arrangement of components such that the separation chamber is proximate to the main chamber. It is of course natural to think that the solids are separated from the gas in connection with the pump itself, whereby the solids, or at least a portion thereof may be easily returned to the suction side of the centrifugal pump, or even directly into the main chamber of the centrifugal pump. When an integrally built vacuum pump is used, the space available is often limited, and poses a problematic design constraint.

The interior of a conventional centrifugal pump is usually too small to house both a separation chamber and a vacuum pump, which are separate relative to the impeller, so that the elements must arranged so that the separation space is located behind the centrifugal pump impeller, in communication with rear vanes of the impeller of the centrifugal pump, which may not separate efficiently in all situations, and thus may allow solids to enter the gas path under certain operating conditions.

Further, this arrangement may sometimes allow solids to clog either the inlet opening of the separation chamber, the outlet opening, the gas discharge opening or even the vacuum pump thereof mounted on the shaft. The clogging of this mechanism results in the stopping of the pump and a time-consuming cleaning and repair process, during which period the mill, if it can operate at all, must manage without the pump. It can therefore be said that a rather small fiber bundle or knot particle can at its worst stop an entire pulp mill.

However, there are a number of deficiencies present in the above described prior systems. Their application range is restricted, because it is not possible to adjust the rotational speed of the centrifugal pump independently of other related components, so that several parallel operating pumps may be required. Additionally the size of the vacuum or separation pump is restricted by the size of the centrifugal pump to which it is integrally attached. Centrifugal pumps including vacuum pumps cannot be operated without the attached vacuum pumps, although the inflow pressure would be sufficient for the gas discharge. In addition, low rotational speeds of the shaft of the centrifugal pump are not permitted, because the second impeller arranged in communication with the pump would leak. Further, the construction of such a pump would make it even more difficult, and practically speaking impossible, to use standard type spare parts. In problematic cases it would be necessary to perform difficult repair processes, because all of the sensitive functional components are positioned inside the same housing and structure, without a possibility of making quick and easy replacements.

Thus it is already known that when pumping fiber suspensions of the wood processing industry by a centrifugal pump, at least when pumping thicker pulps, gas must be separated from the pulp and removed, because gas separates from the pulp in the pump and tends to generate a gas bubble in the center of the pump, in front of the impeller of the centrifugal pump. The presence of a gas bubble in the centrifugal pump prevents operation of the pump, which is no longer able to draw the pulp and pump it. Gas is thus separated from the pulp especially in order to ensure the continued pumping of the pulp by such pumps.

FIG. 1 discloses a system, discussed above with respect to the cited publications, for the discharge of gas from a centrifugal pump 2. In the system in accordance with the drawing, the rear plate 6 of the impeller 4 of the centrifugal pump 2 has been provided with openings 8 for transferring the gas to the space 10 behind the impeller. The rear surface on the rear plate 6 of the impeller 4 is provided with rear vanes 12, the purpose of which is to pump any liquid-fiber suspension which has entered the space 10 through openings 8 back to the main flow towards the outlet port 14 of the pump. A subflow containing mainly gas is led from the central opening 20 in the rear wall 18 of the pump 2 surrounding the shaft 16 of the pump 2 to the separation chamber 22, in which a second impeller 24 rotates. The purpose of the second impeller 24 is primarily to separate the solids in the subflow which enter into the separation chamber 22, so as to prevent them from becoming entrained with the gas flow being discharged through the center of the separation chamber 22. The gas flows via an opening 26 in the separation chamber 22 to a vacuum pump 30, arranged as a separate structure from the actual centrifugal pump 2 by means of a pipe 28, which connects to an inlet port 48 of the vacuum pump 30. The vacuum pump 30 generates a suction or a relatively reduced pressure condition, on which the whole operation of the gas discharge system is based. In the system according to FIG. 1, the fibrous fraction from the separation chamber 22 is passed back to the inlet side of the centrifugal pump 2, to a suction duct 32 of the centrifugal pump 2.

If the fibers or other solids of the fiber suspension are allowed to reach the vacuum pump 30, they could gradually clog the pump 30 and thus prevent the gas discharge and finally result in expensive stoppages. In most cases, in these kinds of systems a liquid ring pump is used as a vacuum pump; such pump is also illustrated in the arrangement in accordance with FIG. 1. A liquid ring pump on the same shaft as the centrifugal pump rotor is disclosed and described in detail in U.S. Pat. No. 4,776,758, which is incorporated herein by reference. A liquid ring pump as used comprises a shaft 34, to the one end of which is mounted the driving means 36 of the pump and to the other end a rotor 38, to which a number of blades 40 have been mounted. The rotor 38 is surrounded by an eccentric chamber 42, the side walls 44, 46 of which, or at least one of them, is provided with suction and discharge conduits 48, 50 for gas flow. The apparatus operates in such a way that when the rotor 38 rotates, the blades 40 throw the liquid in the chamber, due to the centrifugal force, to the rim of the chamber to form a gas pocket trapped within a liquid rotary ring, from which the name "liquid ring pump" for the vacuum pump 30 is derived. Since the blades 40 attached to the hub of the rotor 38 have been arranged as close as possible, in other words with as small clearance as possible, to the side walls 44, 46 of the chamber, normally by sealing with sealing water or liquid, and because the liquid ring seals the tip area of the blades, under- or overpressure areas are generated between the blades according to whether the liquid ring moves away from the shaft, rarifying the gas, or towards it, compressing the gas. By connecting the underpressure areas with a conduit 48 to the source of gas to be pumped, a relative vacuum is generated, sucking the gas toward the liquid ring pump. Respectively, by connecting the overpressure areas to the gas discharge conduit 50, gas or excess liquid possibly present in the pump 30 is pumped out of the pump 30.

The construction in accordance with FIG. 1 has, however, a number of deficiencies. For example, it is not possible to use pumps with a high suction head, because their rotational speed is typically so low, whereby when a second impeller is on the same shaft, the second impeller rotates too slowly, not being able to create a centrifugal force field sufficiently strong for separating solids i.e. fibers from the gas. A way to solve this problem would be to increase the diameter of the separation chamber, but this is impossible as the dimensions of the centrifugal pump housing dictate the size of the separation chamber. For the same reason the adjustment of the rotational speed of the pump is practically speaking impossible, because each of the connected elements must be able to operate.

Additionally, the construction of these devices itself deviates significantly from conventional centrifugal pumps, due to the presence of a separate separation chamber. It is difficult, or even impossible to apply the standard mass produced components manufactured for conventional centrifugal pumps in the pump type described above. In practice, the above described system may be designed and developed optimally only for a particular purpose, in which the material to be pumped has a predetermined particular amount of gas which is separated and a predetermined particular amount of solids flow to the gas discharge port.

Further, this means in practice that the suction head of the pump or the inlet pressure should not substantially vary from the design parameters and must be maintained in a relatively narrow range.

The method and apparatus in accordance with the present invention are used to eliminate or minimize all the deficiencies of the prior art apparatuses and allow a most suitable arrangement for a particular purpose may be used to discharge gas from the centrifugal pump.

OBJECTS OF THE PRESENT INVENTION

According to a first object of the present invention, there is provided an apparatus for pumping gas-containing fiber suspensions, this apparatus including means for efficiently separating the gas from the fiber suspension being pumped and which gas is subjected to a relatively reduced pressure for the discharge of the gas from the centrifugal pump having a housing and an impeller which is rotatable within the housing, the centrifugal pump having means for allowing a portion of the fiber suspension having an increased gas content and containing gas, liquid and solids to escape into a first duct, comprising a separating means, operating separately from the centrifugal pump, for receiving the portion which escapes through the first duct and for separating the escaped portion into a solids fraction and a gas fraction, comprising means for allowing the gas fraction to escape from said separating means into a second duct and a vacuum means for providing a region of relatively reduced pressure, comprising a port for allowing the gas fraction to enter said region of relatively reduced pressure through said second duct, so that the portion of the fiber suspension having an increased gas content is withdrawn from the centrifugal pump, and a discharge port for discharging the gas fraction from said vacuum means. The vacuum means may comprise a vacuum pump driven by a shaft, with the separating means driven by a shaft, and both the vacuum pump and separating means arranged proximate to one another and arc driven by the same shaft.

Also in accordance with the apparatus of the present invention, an apparatus is provided wherein the separating means comprises a separation chamber, an impeller rotatably mounted therein, an inlet opening for receiving the fiber suspension portion which escapes from the centrifugal pump through the first duct and the second duct for communicating with said vacuum means.

It is also an object of the present invention to provide a medium treatment apparatus wherein the vacuum source is a liquid ring pump.

In still another aspect of the present invention, an apparatus is provided for the treatment of a fiber suspension in which gas is separated from the fiber suspension being pumped and which gas is subjected to a relatively reduced pressure for the discharge of the gas from the apparatus, comprising a centrifugal pump having a housing, an impeller which is rotatable within the housing along an axis of rotation, and means for allowing a portion of the fiber suspension having an increased gas content and containing gas, liquid and solids to escape into a first duct, a separating means, operating separately from said centrifugal pump, for receiving the portion which escapes through said first duct and for separating the escaped portion into a solids fraction and a gas fraction, comprising means for allowing the gas fraction to escape from said separating means into a second duct and a vacuum means for providing a region of relatively reduced pressure, comprising a port for allowing the gas fraction to enter said region of relatively reduced pressure through said second duct, so that the portion of the fiber suspension having an increased gas content is withdrawn from said centrifugal pump, and a discharge port for discharging the gas fraction from said vacuum means. The centrifugal pump may comprise a fluidizing rotor, and with such a rotor may be used as a de-flaker for waste paper.

It is a further aspect of the present invention to allow various elements which comprise the treatment apparatus to operate in parallel, taking further advantage of the separation of the separator and vacuum pump from the centrifugal pump.

BRIEF DESCRIPTION OF THE DRAWINGS

The preferred embodiments of the method and apparatus in accordance with the present invention are shown by way of example in detail in the accompanying drawings in which.

DETAILED DESCRIPTION OF THE PREFERRED EMBODIMENTS

Figure 1:
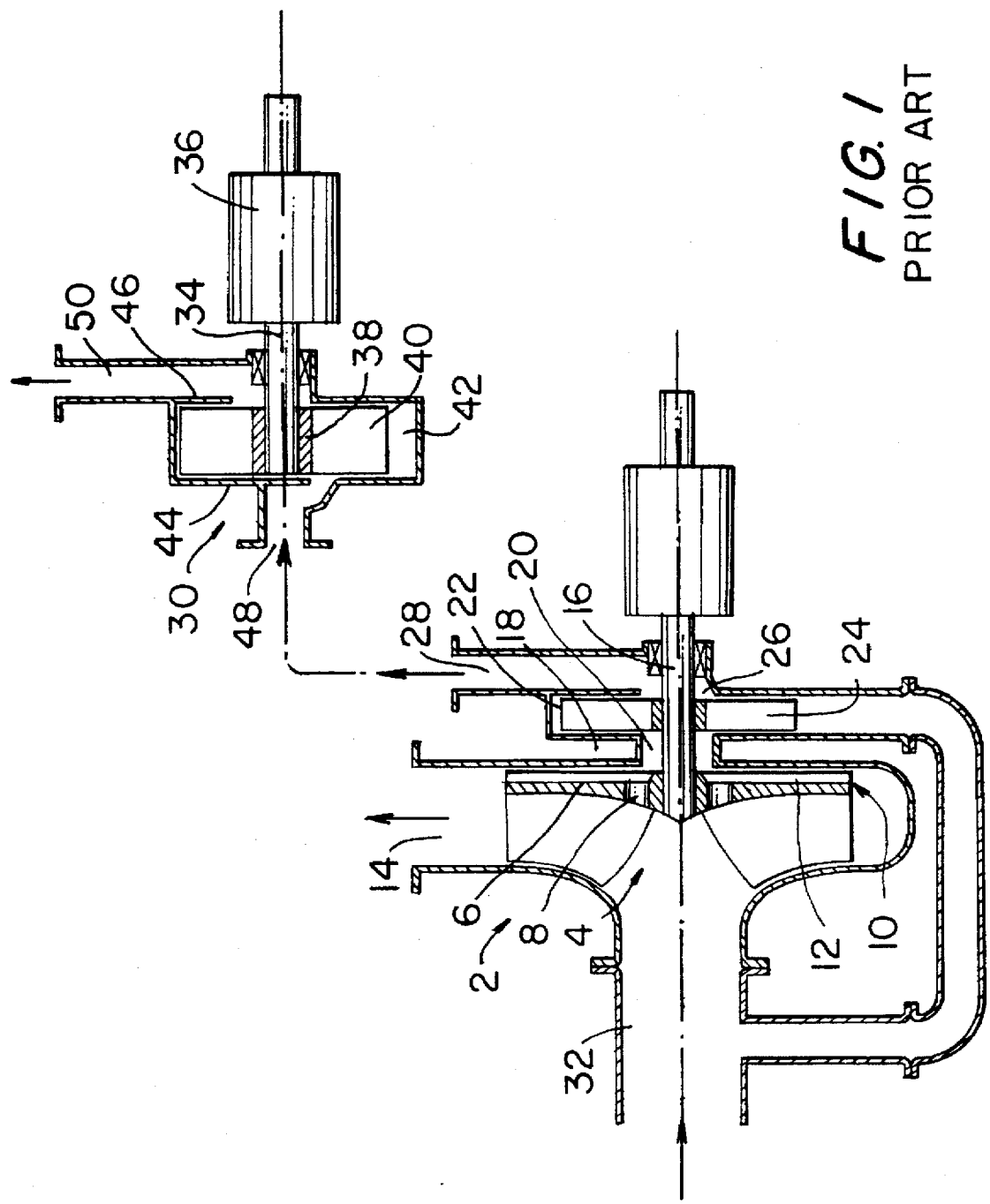
FIG. 1 is a schematical illustration of a system in accordance with the prior art.
Figure 2:
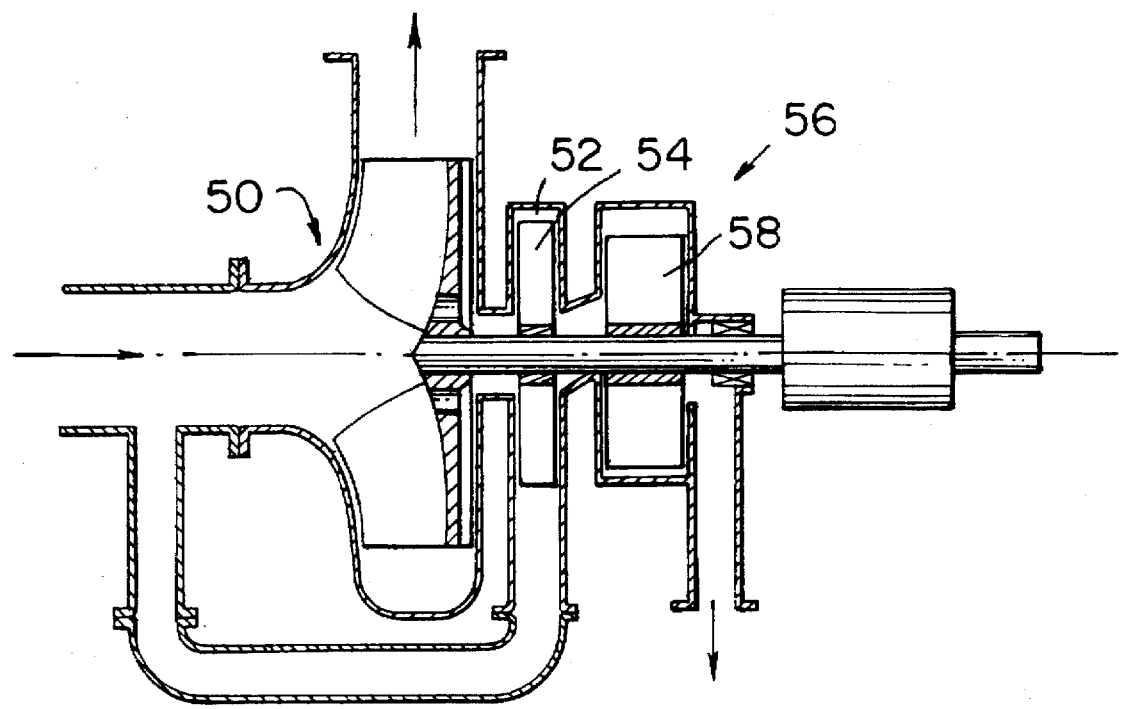
FIG. 2 is a schematical illustration of a second system in accordance with the prior art.

FIG. 1 discloses the prior art system described above with reference to the prior art technique. The arrangement of FIG. 2, also in accordance with the prior art, is substantially similar to, and corresponds with the pump disclosed in U.S. Pat. No. 3,230,890. The pump combination of FIG. 2 consists of a centrifugal pump 50, a separation chamber 52 with an impeller 54 and a vacuum pump 56 with a rotor 58 all mounted on the same shaft.

Figure 3:
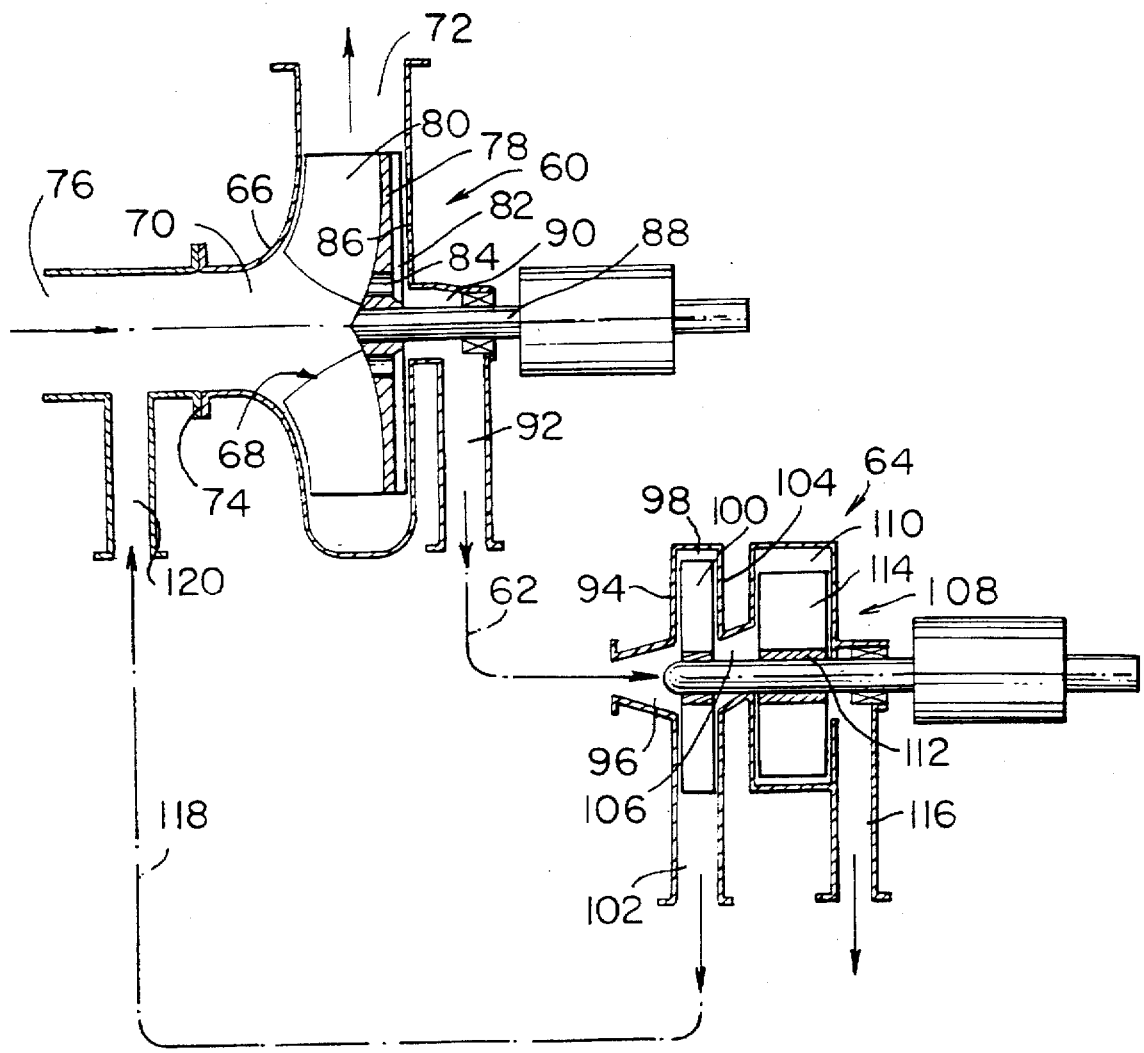
FIG. 3 is a schematical illustration of an embodiment of the present invention.

FIG. 3 discloses a system according to a preferred embodiment of the present invention, which comprises a centrifugal pump, which can be either a conventional centrifugal pump 60 or a so called fluidizing centrifugal pump, and a separator-vacuum pump combination 64 connected thereto by a pipe 62. The centrifugal pump 60 conventionally comprises a housing 66 of the pump, a centrifugal impeller 68 rotatably arranged within the housing 66, an axial suction inlet 70 and a tangential pressure conduit 72. The suction inlet 70 is connected by a flange 74 to a suction duct 76, which may alternatively be replaced by a vessel or the like containing the fluid to be pumped. The centrifugal impeller 68 comprises a rear plate 78, working vanes 80 extending from the rear plate 78 toward the suction inlet 70, so called rear vanes 82 on the opposite side of the rear plate 78 and gas discharge openings 84, piercing the rear plate 78 of the impeller 68. These openings 84 may, in some instances, be replaced by a passage along the shaft 88 of the impeller 68. Another way replace the openings through the rear plate 78 is to arrange open slots extending from the circumference of the rear plate 78 towards the shaft 88 or merely by employing a rear plate 78 of such diameter that gas may be discharged around the circumference of the rear plate 78 to the gas discharge system. The rear wall 86 of the centrifugal pump housing 66 is preferably provided with a central opening 90 surrounding the shaft 88 of the pump 60, or a chamber, which is connected to the pipe 62 via a gas discharge conduit 92 arranged in the housing 66.

The second main component of the apparatus in accordance with the preferred embodiment of the invention is the separator/vacuum pump unit 64 which comprises a casing having a substantially cylindrical separation chamber 98 having a front wall 94 and a rear wall 104, and a preferably eccentric vacuum chamber 110. The housing is provided with a shaft penetrating axially therethrough. On the shaft, there is mounted an impeller 100 arranged in the separation chamber and a rotor 112 arranged in the vacuum chamber 110. The housing further comprises a central axial inlet 96 to be connected with the gas discharge pipe 62 for introducing the medium flowing via pipe 62 from the centrifugal pump to the separation chamber. The housing, as well as the separation chamber 98, also comprise a preferably tangential outlet 102 for discharging the solids and liquid separated from the flowing medium. The outlet 102 is, in accordance with a preferred embodiment of the invention, connected by means of a pipeline 118 and a return inlet 120 to the suction duct 76 of the centrifugal pump. The rear wall 104 of the separation chamber 98 is provided with a preferably central opening surrounding the shaft for allowing the gas from the separation chamber to flow into the vacuum chamber 110. The front wall of the vacuum chamber is provided with a non-central opening for receiving the gas from the separation chamber 98. The central opening in the rear wall of the separation chamber 98 and said non-central opening in the front wall of the vacuum chamber 110 are connected by means of a flow passage 106. The vacuum chamber 110 is preferably eccentric, the eccentricity being either radial, axial or a combination thereof. The rotor 112 rotating in the vacuum chamber 110 is provided with blades 114, which are preferably substantially radial, for rotating a liquid ring along the circumference of the vacuum chamber 110. The vacuum chamber 110, more particularly the rear wall thereof, is provided with a non-central opening for discharging the gas from the vacuum chamber 110. In other words, the inlet opening to the vacuum chamber 110 and the outlet opening therefrom are located on opposite sides of the vacuum pump.

An apparatus in accordance with the invention operates in the following way. The suction generated by the vacuum pump 108 is transmitted through the separation chamber 98 and the pipe 62 to the back side of the impeller 68 of the centrifugal pump 60, which further transmits the suction effect or relatively reduced pressure condition either around the rim of the rear plate 78 of the impeller 68 or via the openings 84 of the rear plate 78 to vent the gas bubble which exists in front of the impeller 68. The gas bubble is generated in front of the impeller 68 of the pump 60 on the side of the suction duct 70 either merely due to the vacuum or suction effect generated by the pump 60 or possibly due to the rotational force to the material being pumped, due to the centrifugal forces and the difference in density between the gas and liquid and solid material. The bubble is produced by both the impeller 68 of the pump 60 and the fluidizing rotor of an alternative embodiment of the present invention.

In a pump incorporating a fluidizing rotor, the fluidizing vanes extend beyond the forward portion of the working vanes 80, into the suction duct 70, which serve to fluidize the pulp suspension and facilitate its entry into the centrifugal pump. Such an arrangement, in addition to gas discharge and fluidization of the high consistency pulps, can also be utilized for the deflaking of paper and other similar particles during the recycling of pulp. Such fluidizing rotors are known, for example from U.S. Pat. Nos. 4,780,053 and 4,776,753, which are incorporated herein by reference. Pumps incorporating such rotors are sold by the assignee of the present invention, A. Ahlstrom Corporation, as an MC® pump.

In the embodiment shown in FIG. 3, the suction of the vacuum pump 108 causes the discharge of gas from the bubble to the space behind the impeller 68 either completely clean or more usual usually, mixed with the material being pumped, whereby both liquid and fibers are entrained, when fiber suspensions are concerned, with the gas. The rear vanes 82 rotate in the space behind the rear plate 78, and at least part of the solid material and/or liquid flows outwardly and into the forward space, back into the main flow path in the spiral of the centrifugal pump. Since the pipe 62 from the centrifugal pump 60 to the separation chamber 98 is wide, there is no risk of the fibers and liquid still entrained with the flow clogging the pipe 62. The separated fluid consequently flows freely to the separation chamber 98, in which it is subjected to an intense centrifugal force by the rotary impeller 100, the purpose of which is to separate all of the solid material toward the outer rim of the chamber 98, from which it is further fed through the discharge conduit 102, for example, back to the suction side of the centrifugal pump 60 to the suction duct 76 via pipe 118 and conduit 120. The rear wall 104 of the separation chamber 98 is provided with an opening 106, which is preferably located axially on the side of the separation chamber 98 proximal relative to the vacuum pump, i.e. between the separation chamber and the vacuum pump 108, but radially on the side of the vacuum pump 108 that is associated with the vacuum pump eccentric, i.e. that side which produces underpressure. The gas flows through the gas discharge opening 106 to the vacuum pump 108, through the wall of the casing. The opening is located in such that, as stated above, it is located at an underpressure zone at that portion of the vacuum chamber 110 which expands in the volume relative to the rotational direction of the rotor 112, so that when the liquid ring escapes away from the shaft, a suction is generated, and gas from the gas discharge opening 106 is drawn into the liquid ring pump. Respectively, gas is discharged from the pump from the opposite side of the shaft, from a location where the portion of the vacuum chamber 110 tends to decrease in volume relative to the rotational direction of the rotor 112. The chamber volume tends to decrease when the liquid ring becomes radially closer to the shaft. It is in many cases important for the operation of the liquid ring pump that it is able to create, when necessary, a very high underpressure or respectively that it is possible to further pump gas with it or generally material coming from the gas discharge opening 116 with as high pressure as possible. Consequently, the sealing of the rotor of the liquid ring pump relative to its chamber is crucial, which in most cases is secured by the feed of the sealing liquid to the space between the blades and the wall of the chambers and also by arranging the clearances between the side walls of the blades and the chamber as small as possible.

It is also possible that instead of being recycled into the suction duct 76 as stated above, the solid material, or the excess liquid being separated from the separation chamber 98, is returned, for example, to the upper part of the mass tower. A filter, or other apparatus may act on this return flow to eliminate certain undesired content, if desired. Similarly, the material i.e. the gas, being discharged from the vacuum pump 108 through the gas discharge opening 116 may be returned to the mass tower. In such cases, it is required that the vacuum pump 108 must be able to develop a sufficient head to transfer the mixture to the mass tower.

Further it should be mentioned that if in some cases the risk of large amounts of the fibrous material flowing to the vacuum pump 108 seems to be too high, a screen can be mounted between the separation chamber 98 and the vacuum pump 108, by means of which the drifting of the fibers to the vacuum pump 108 is prevented. However, if a screen is present, there is of course the risk that the screen surface may clog because of the fibers. This is easily prevented by arranging, for example, the surface of the separation rotor on the screen side either to generate such a high turbulence that no fiber matting is formed on the screen surface, or by arranging a ridge to spirally circulate on the rotor surface very close to the screen surface thereby wiping the screen surface clean from fibers.

Figure 4:
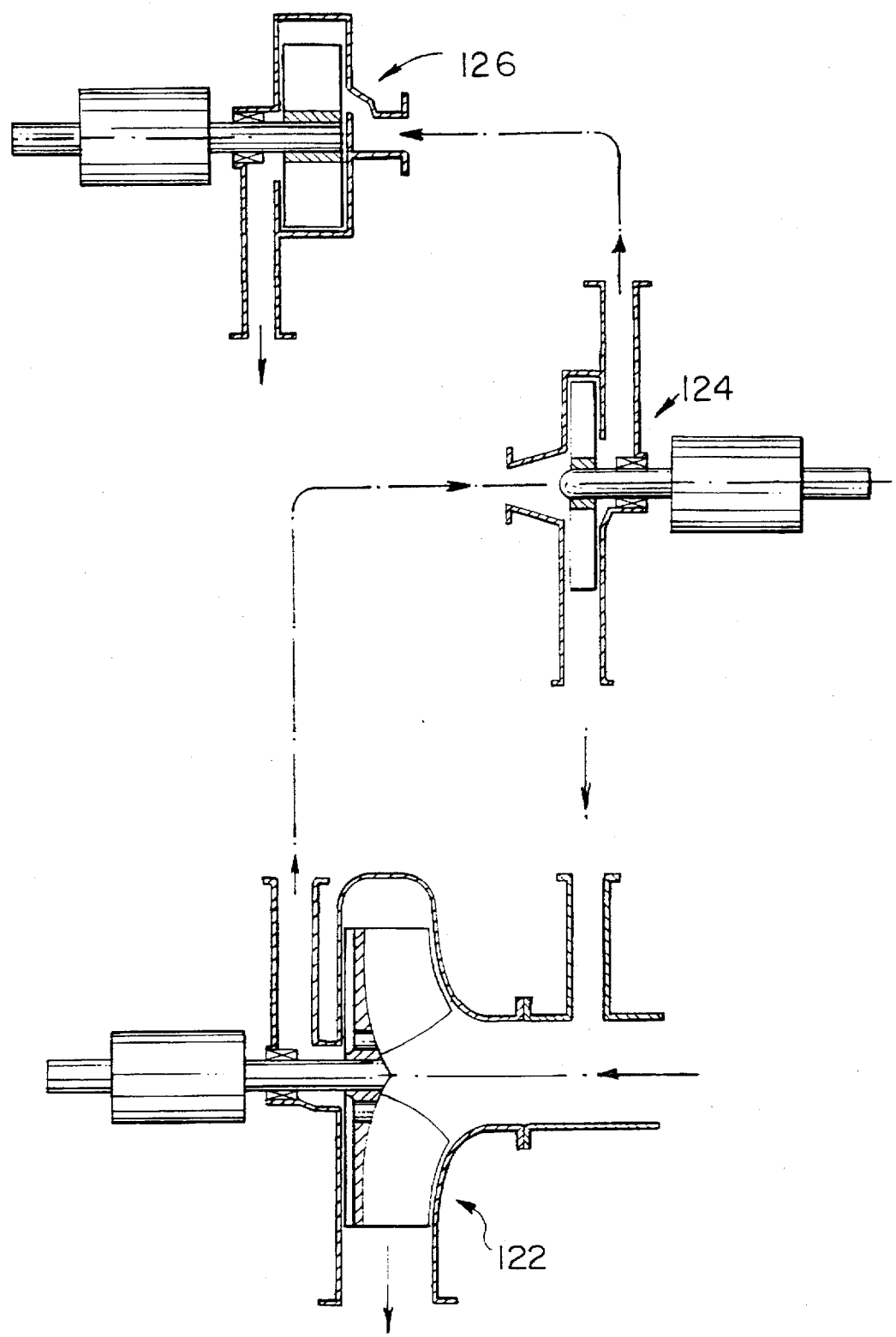
FIG. 4 is a schematical illustration of a second embodiment of the present invention.

FIG. 4 discloses yet another embodiment of the present invention, in which all the components of the embodiment, a centrifugal pump 122, a separator 124 and a vacuum pump 126 are arranged as separate apparatuses and provided with separate driving means. Although the described system seems to be complicated and less progressive, it has several advantages compared with the above described systems and at least with respect to the prior art technique. The described system has all the advantages of the embodiment of FIG. 3 and additionally a number of advantages brought about by its own special features. This embodiment has the largest application range of the described apparatuses, because a slowly rotating, intensively drawing (high suction) centrifugal pump may be used, whereby the vacuum pump 126 may be rotated exactly at an appropriate speed and the vacuum pump 126 can be chosen exactly according to the particular need for gas discharge. Additionally, it is possible to use a so called long-range suction, in other words a vacuum source may be connected to the discharge side of the separating apparatus at a distance. It does not, however, have to be a liquid ring pump especially reserved for this purpose, but some other apparatus or a vacuum pump arranged mainly for the needs of some other apparatus. A single vacuum pump may service a variety of elements, if appropriate. If, on the other hand, the inlet head of the system is sufficient, it is possible to leave the vacuum pump entirely out of the apparatus, whereby gas is discharged directly from the separating apparatus by means of the inlet pressure of the centrifugal pump. Furthermore, less expensive apparatuses are required, because there is no need to build and design separation chamber-vacuum pump combinations for every possible purpose and situation; it is enough to connect different apparatuses to each other by means of pipes or conduits. Thus, a fewer number of standard types of elements need be manufactured and stocked, because the separation of the elements of the present invention allows operation over a wider range of conditions of each type of element, and additionally, certain types of elements may operate in parallel, if need be. For example, a number of centrifugal pumps may be connected through separate separation chambers to a single vacuum pump or directly to a single separation chamber/vacuum pump combination. Thus, in the system of FIG. 3, a plurality of centrifugal pumps 60 may be connected by the conduit 92 through a manifold arrangement replacing the pipe 62 to a separator-vacuum pump combination 64. In the system of FIG. 4, a plurality of centrifugal pumps 122 may be connected by conduit to one or more separators 124 which are then connected to one or more vacuum pumps 126. Also it must be noted that the elements of the present invention are readily available in the market. For example, a series of practical vacuum pumps are applicable, which can be used as components of these kinds of systems. Further, only a very simple separate separating apparatus is required, and only a few sizes of the independent separating apparatus are sufficient to accommodate the intended uses.

As can be appreciated from the above, a new kind of method and apparatus have been developed for the discharge of gas from the medium, which method and apparatus enable the use of standard spare parts as often as possible. For example, in the pumping of pulp it is possible to use pumps with a standard casing type, wherein only the impeller may require some minor adjustments. Additionally a separate vacuum pump of the type described makes repairs easier and thus considerably diminishes the repair and maintenance costs of the mill. It should be noted that since the gas discharge channel leading to the separating apparatus of the centrifugal pump is wide it does not clog, but rather, it is likely that the first apparatus to clog would be the separating apparatus. The separating apparatus, when clogged, may be disconnected from the centrifugal pump, whereby there is no need to stop the centrifugal pump. It should also be considered that although the invention is described in detail with reference to the centrifugal pump and pulp treatment, the method in accordance with the present invention may well be applied to any application purpose, in which separated gas must be discharged from the medium.

The present invention may be controlled according to various methods known to those of ordinary skill in the art. For example, a control method and apparatus is disclosed in U.S. patent application Ser. No. 07/650,032, now U.S. Pat. No. 5,141,535, filed Feb. 4, 1991, which claims priority from corresponding Finnish Patent Application 900525, filed Feb. 2, 1990, to the assignee of the present application which is incorporated herein by reference.

It should be understood that the preferred embodiments and examples described herein are for illustrative purposes only and are not to be construed as limiting the scope of the present invention, which is properly delineated only in the appended claims.

What is claimed is:

1. An apparatus for pumping fiber suspensions of pulp and paper industry, said apparatus comprising the combination of a centrifugal pump and a separation/vacuum unit, said centrifugal pump having a housing with an axial inlet, a tangential outlet for degassed medium and a back wall opposite to said axial inlet, and a centrifugal impeller arranged in said housing on a shaft driven by a first drive means; said impeller having a rear plate with working vanes arranged on the side facing said axial inlet and back vanes on the side facing said back wall of the housing; at least one of said impeller and said shaft further having a flow passage for introducing gas containing medium from the side of the impeller facing said axial inlet to the side of the impeller facing said back wall; said back will having an opening connected to a flow passage introducing said gas containing medium to a pipe connecting the opening of said centrifugal pump to an axial inlet of said separation/vacuum unit; said separation/vacuum unit comprising a casing with a separation chamber and a vacuum chamber, a shaft driven by a second drive means extending through said casing and said chambers and provided with an impeller in said separation chamber and a rotor in said vacuum chamber, said separation chamber further having a tangential outlet for discharging a gas-free medium from said separation/vacuum unit and an axial outlet for discharging gas from said separation/vacuum unit, said vacuum chamber further having an axial inlet for receiving gas from said axial outlet of said separation chamber and a tangential outlet for discharging said gas from said vacuum chamber.

2. The apparatus as recited in claim 1, wherein said vacuum chamber is eccentric forming a chamber for a liquid ring vacuum pump.

3. The apparatus as recited in claim 1 further comprising a pipeline connected between said tangential outlet of said separation chamber and a point upstream of said axial inlet of said centrifugal pump.

4. An apparatus for pumping fiber suspensions said apparatus, comprising the combination of a centrifugal pump and a separation unit, said centrifugal pump having a housing with an axial inlet, a tangential outlet for degassed medium and a back wall opposite to said axial inlet, and a centrifugal impeller arranged in said housing on a shaft driven by a first drive means; said impeller having a rear plate with working vanes arranged on the side facing said axial inlet and back vanes on the side facing said back wall of the housing; at least one of said impeller and said shaft further having a flow passage for introducing gas containing medium from the side of the impeller facing said axial inlet to the side of the impeller facing said back wall; said back wall having an opening connected to a flow passage introducing said gas containing medium to a pipe connecting the opening of said centrifugal pump to an axial inlet of said separation unit; said separation unit comprising a casing with a separation chamber, a shaft driven by a second drive means extending through said casing and said separation chamber and provided with an impeller in said separation chamber, said separation chamber further having a tangential outlet for discharging a gas-free medium from said separation unit and an axial outlet for discharging gas from said separation unit.

5. The apparatus as recited in claim 4, further comprising a vacuum pump having a vacuum chamber with a rotor arranged on a shaft driven by a third drive means in said vacuum chamber, an inlet for receiving gas from said separation chamber and an outlet for discharging gas from said vacuum chamber; said inlet of said vacuum chamber being connected to said outlet of said separation chamber by means of a pipe means.

6. The apparatus as recited in claim 5, wherein said vacuum chamber is eccentric and said pump is a liquid ring vacuum pump.

7. The apparatus as recited in claim 4, further comprising a pipeline connected between said tangential outlet of said separation chamber and a point upstream of said axial inlet of said centrifugal pump.

* * * * *